United States Patent [19]

Doll et al.

[11] Patent Number: 5,779,194
[45] Date of Patent: Jul. 14, 1998

[54] JOINT FOR A CANTILEVER ARM ON A SATELLITE

[75] Inventors: Bernhard Doll; Wolfram Beckert, both of Immenstaad; Reinhard Wolters, Salem, all of Germany

[73] Assignee: Dornier GmbH, Germany

[21] Appl. No.: 655,684

[22] Filed: Jun. 3, 1996

[30] Foreign Application Priority Data

Jun. 27, 1995 [DE] Germany .................. 195 23 236.4

[51] Int. Cl.[6] .................................................. B64G 1/22
[52] U.S. Cl. ........................... 244/158 R; 16/82; 16/286
[58] Field of Search ........................... 244/161, 173, 244/158 R; 16/82, 286, 292; 52/281, 282.1, 282.3; 248/900, 291.1, 292.13

[56] References Cited

U.S. PATENT DOCUMENTS

| 1,600,461 | 9/1926 | Ensign ..................... 248/291.1 |
| 3,187,372 | 6/1965 | Parsons ..................... 16/82 |
| 4,183,490 | 1/1980 | Montanarini ................. 248/292.13 |
| 4,393,541 | 7/1983 | Hujsak et al. . |
| 4,532,674 | 8/1985 | Tobey et al. . |
| 4,736,490 | 4/1988 | Wesselski . |
| 4,787,590 | 11/1988 | Melvin ..................... 248/291.1 |

FOREIGN PATENT DOCUMENTS

| 0 101 361 | 7/1983 | European Pat. Off. . |
| 0 194 169 | 1/1986 | European Pat. Off. . |
| 0 295 083 A2 | 6/1988 | European Pat. Off. . |
| 1.591.114 | 6/1970 | France . |
| 2 003 811 | 8/1971 | Germany . |
| 31 01 436 | 11/1982 | Germany . |
| 39 00 005 A1 | 5/1990 | Germany . |
| 42 36 242 A1 | 4/1994 | Germany . |
| 1 322 241 | 7/1973 | United Kingdom . |
| 1322241 | 7/1973 | United Kingdom . |
| WO91/03315 | 3/1991 | WIPO . |

*Primary Examiner*—Andres Kashnikow
*Assistant Examiner*—Tien Dinh
*Attorney, Agent, or Firm*—Evenson, McKeown, Edwards & Lenahan, P.L.L.C.

[57] ABSTRACT

The invention relates to a joint for folding and unfolding a cantilever arm on a satellite. Pivoting of the cantilever arm during unfolding is governed by a guide element which is rigidly connected with the end of the cantilever arm and is held against stop plates which are rigidly attached to the satellite, by means of at least one coil tension spring connected with cantilever arm and with satellite itself. Each of the stop plates has first, second, and third unfolded stops which cooperate with the guide element. The first and second unfolded stops are mounted symmetrically with respect to the motion plane of cantilever arm. During unfolding of the cantilever arm, the guide element strikes alternately the first two unfolded stops on the one hand and the third unfolded stop on the other hand; and with cantilever arm in the unfolded state it abuts all three unfolded stops. Two additional stops rigidly connected with satellite are provided for guide element, on which cantilever arm rests in the folded state.

7 Claims, 3 Drawing Sheets

JOINT FOR A CANTILEVER ARM ON A SATELLITE

BACKGROUND AND SUMMARY OF THE INVENTION

The invention relates to a joint for folding and unfolding a cantilever arm on a satellite.

Uniaxial unfolding mechanisms for folding and unfolding (deploying) a cantilever arm are used in most satellites. (Antennas or magnetometers are typically mounted at the outer end of the cantilever arm.) The vibrations associated with launching must be withstood without damage in the folded state. As a rule, the mechanism is activated shortly after release of the satellite. It may already have been exposed to extreme temperatures during activation. As a rule, the required unfolded length is approximately 0.5 to 1.5 m.

Typically performance criteria for unfolding mechanisms of this type are as follows:

Approximately 0.5° alignment accuracy in the unfolded state in all axes;

Adaptability to extreme temperature fluctuations (−190° C.–100° C.) before and after the unfolding process;

The temperature range during unfolding is typically held in the range from −10° C. to 50° C. by early unfolding or thermal conditioning (satellite revolving in the sun);

Operability in a vacuum;

Ability to withstand strong vibrational loads in the folded state (approximately 20 g sinusoidal excitation up to 100 Hz);

Small disturbing moments in the unfolded state (<0.1 Nm as a rule).

In prior art devices of this type, the joint of the mechanism is embodied in a (redundant) bearing as well as leg springs. As a rule, a latching mechanism is also employed, especially because the driving force of the leg springs has insufficient reserves with respect to bearing friction in the unfolded state.

The disadvantage of the known methods is that large driving moments, seldom effective in orbital operation, must be provided for reliably overcoming the bearing and latching frictional resistances (to be calculated with high safety factors). Moreover, because of the high driving moment, a high shock load is generated at the latching point, which can be damped only by costly measures.

German patent document DE 31 01 431 A1 teaches an unfolding mechanism for satellites, made in the form of a toggle joint. Here again, relatively high shock loading develops during unfolding.

British patent document GB 1,322,241 teaches another unfolding mechanism for satellite applications, in which the cantilever arm is connected with the satellite by a shaft. In addition, the end of the arm adjacent the satellite is provided with a coil tension spring connected with both the arm and the satellite. This joint has the advantage that shock loads are avoided during unfolding. The arm swings out gently beyond its final radial rest position after it is unfolded, and locks in the rest position after several oscillations. However, the disadvantage of this device is that even slight disturbing moments suffice to move the arm out of the radial rest position once again.

The object of the present invention is to provide a suitable joint that firstly avoids shock loading during unfolding and secondly locks reliably in the unfolded state even with higher disturbing moments.

This object is achieved by the joint according to the invention, which comprises a guide element rigidly connected with the cantilever arm of the satellite and at least one internally pretensioned coil spring which is connected with the cantilever arm and with the satellite. Three stops rigidly connected with the satellite structure (first, second, and third "unfolded stops"—that is, stops which support the arm in its unfolded state) are provided for the guide element. The first and second unfolded stops are mounted symmetrically with respect to the motion plane of the cantilever arm so that, during unfolding of the cantilever arm, the guide element alternately strikes the first two unfolded stops, and then the third unfolded stop. The cantilever arm rests on the three unfolded stops in the unfolded state. Two additional stops rigidly connected with the satellite structure (folded stops) are provided for the guide element, on which the cantilever arm rests in the folded state.

The joint according to the invention operates as follows: in the folded state the guide element rests on the two folded stops in such manner that the springs are tensioned to ensure protection against vibrational loads. When the hold-down point for the cantilever arm is released, the springs erect the cantilever arm (weightlessness is required), since its erecting moment is chosen to be much greater than the elastic moduli (exerted by a cable mounted on the cantilever arm, for example). The guide element then initially strikes the two unfolded stops which are mounted symmetrically with respect to the motion plane of the cantilever arm. Thereafter, the arm swings beyond (hereinafter, "overswing") its equilibrium position (that is, the rest position of the cantilever arm in the unfolded state, which as a rule displaced 90° relative to the folded position). The guide element then strikes a third unfolded stop, and is lifted off the two first unfolded stops. As a result of the overswing, the tension springs are stretched farther and farther until the arm moves in the opposite direction under the influence of the spring force (in the direction of the folded position, hereinafter referred to as swinging in). During swinging in, the guide element again rests on the first two unfolded stops.

At the first approach, the arm has an overswing of about 20° in one advantageous embodiment. Following several oscillations (less than one minute as a rule), the arm remains in the unfolded state and abuts all three unfolded stops. This produces a stable three-point bearing. This stable support can only be departed from under the influence of disturbing moments of <1 Nm for example (by comparison with the <0.1 Nm typically associated with satellite maneuvers).

The connection between the satellite and the cantilever arm in the joint according to the invention is provided by the coil springs alone, and does not require bearing axes or the like.

The joint according to the invention can be combined with known types of cantilever arms and hold-down points (for example fixed bearings, bolt separators), and has the following advantages over the prior art devices:

Redundant drive;

Extended temperature range for the unfolding process;

No thermal stresses are possible in the stowed, i.e. folded, state;

No hard end stop and no latching mechanism required; hence low shock loads upon latching;

No bearing friction, hence abundant reserve for "bending" of the cable strand. A safety factor >3 can be provided in every position. This static reserve is not provided by any currently known mechanisms;

Low manufacturing costs;

Lower testing and installation costs because of the sturdy design.

Other objects, advantages and novel features of the present invention will become apparent from the following detailed description of the invention when considered in conjunction with the accompanying drawings.

DETAILED DESCRIPTION OF THE DRAWINGS

Figure 1:
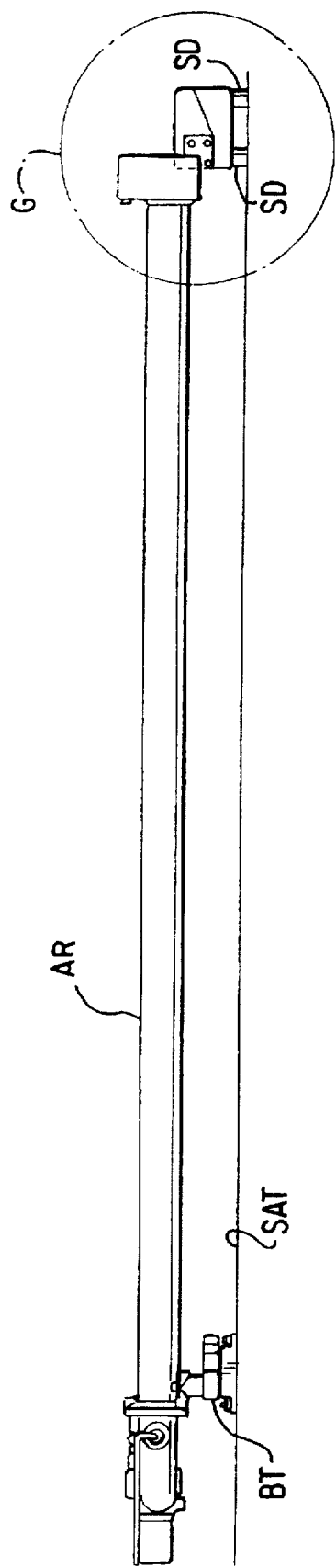
FIG. 1 shows a cantilever arm with a joint according to the invention.

FIG. 1 shows a cantilever arm AR with joint G according to the invention. Joint G is mounted on satellite SAT by fiberglass-reinforced plastic spacing disks SD (FIG. 2) which serve for thermal decoupling. The cantilever arm AR, which in this design is made of carbon-fiber-reinforced plastic, has a diameter of 40 mm. and is approximately 1 m long, is shown folded. It is held at its end opposite joint G by a bolt separator BT against the spring forces of the joint on satellite structure SAT.

Figure 2B:
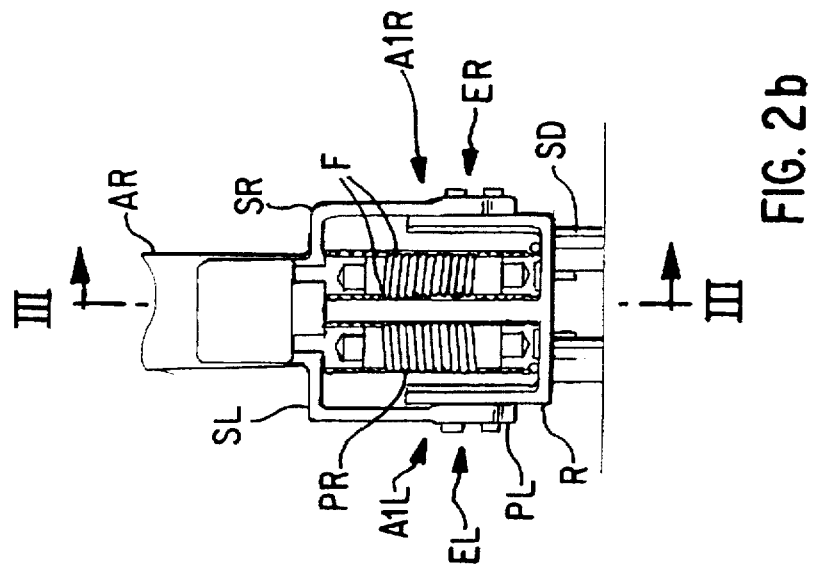
FIGS. 2a and 2b show a joint according to the invention in side and end sectioned views, respectively.
Figure 2A:
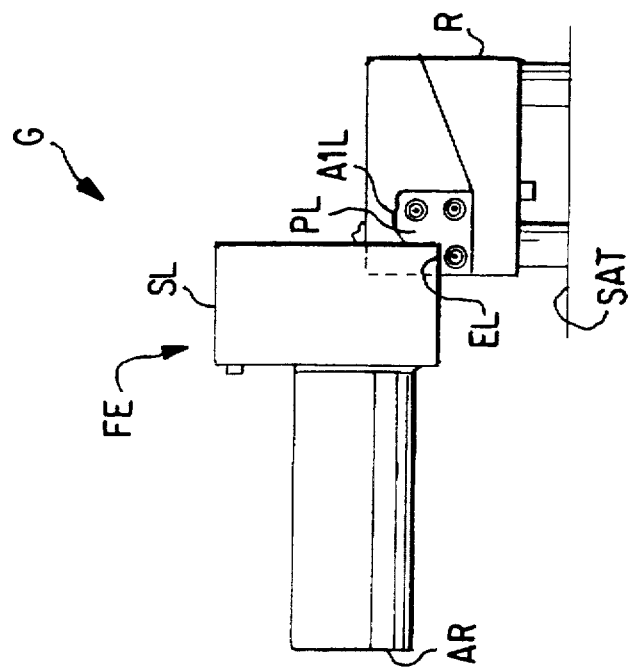

FIG. 2a shows an enlarged side view of the joint G of FIG. 1, also in a folded state, while FIG. 2b is a sectional view (taken along line IIb—IIb in FIG. 3b) of joint G in the unfolded state, with the cantilever arm deployed upwardly.

An articulated frame R is permanently attached to satellite structure SAT by fiberglass-reinforced plastic spacing disk SD. Two stop plates PL, PR, preferably made of carbonfiber-reinforced plastic, are mounted on the essentially vertical outside walls of articulated frame R, symmetrically with respect to the motion plane of cantilever arm AR. The roughly step-shaped upper edge of each stop plate PL, PR forms a folded stop (lower stage) EL or ER as well as an unfolded stop (upper stage) A1L or A1R. The two unfolded stops A1L, A1R are arranged symmetrically with respect to the motion plane (parallel to the plane of the drawing in FIG. 2a) of the cantilever arm. As can be seen from FIG. 2a, the two unfolded stops A1L, A1R are slightly rounded in the direction of the folded position of cantilever arm AR. In this manner, it is advantageously provided that when cantilever arm AR is swung in, guide element FE rolls on stops A1L and A1R, and therefore does not slide or slip on them. For this purpose, the corresponding area of guide rails SL or SR on guide element FE may also be rounded.

The parallel coil tension springs F are provided in the joint. As shown by way of example in this embodiment, these may be two stainless-steel springs with a wire diameter of 3 mm and a spring diameter of 20 mm. One end of each of springs F is connected with the base of cantilever arm AR, while the opposite ends of springs F are anchored on the base plate of articulated frame R which in turn is rigidly connected by spacing disks SD with satellite structure SAT.

Guide element FE already mentioned above is permanently mounted on the cantilever arm, and comprises two guide rails SL, SR parallel to one another. In the folded state as shown in FIG. 2a, guide rails SL, SR of guide element FE have their lateral edges resting on the two folded stops EL, ER of stop plates PL, PR.

Figure 3C:
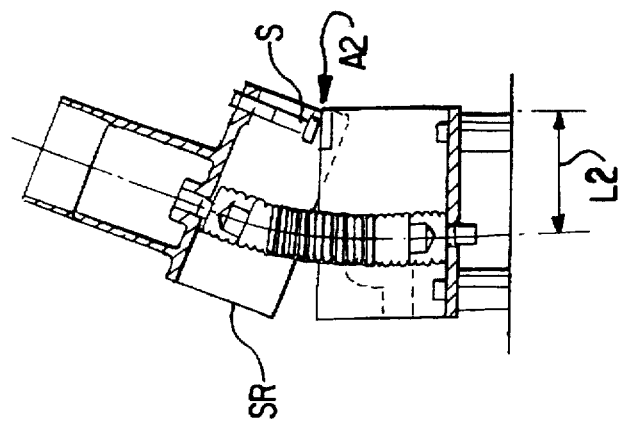
FIGS. 3a–3c show a joint according to the invention in three different positions of the cantilever arm.
Figure 3B:
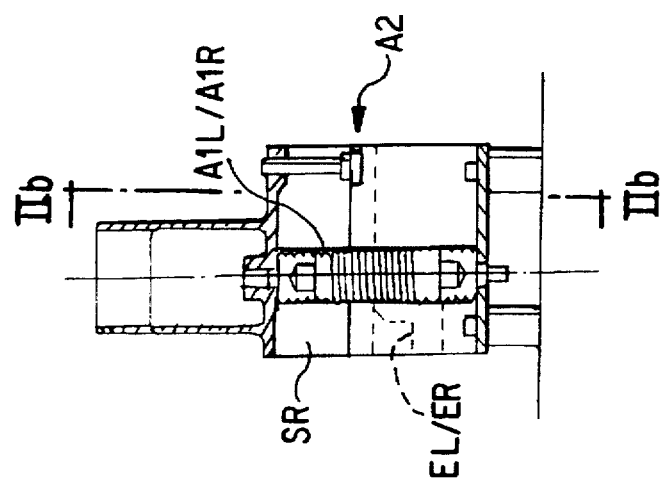
Figure 3A:
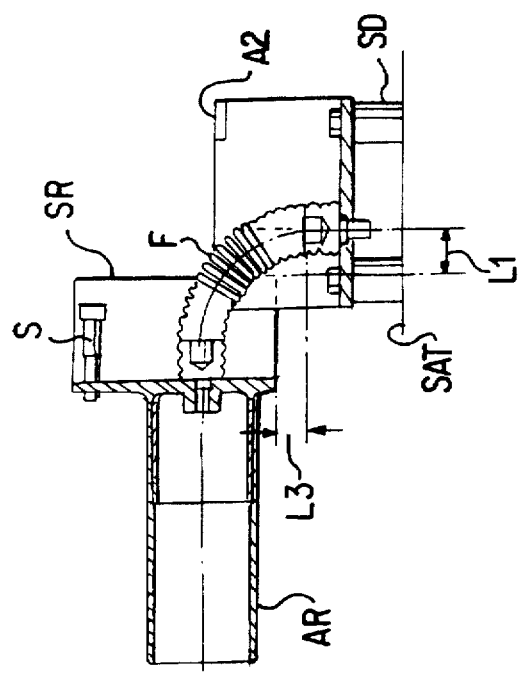

In the unfolded position shown in FIG. 2b, the guide rail SL rests on first unfolded stop A1L. The other guide rail SR rests on second unfolded stop A1R. A horizontal transverse rib provided on the articulated frame R serves as a third unfolded stop A2 as shown in FIGS. 3a–3c. This rib is preferably provided in the middle between the two frame side walls. An adjusting screw S (FIGS. 3a–3c), permanently connected with the guide element FE, rests against the third stop A2 in the unfolded position. By turning adjusting screw S, the alignment of the cantilever arm in the unfolded position can be adjusted. In this position cantilever arm AR thus rests on all three stops A1L, A1R, and A2, so that a stable three-point bearing is provided.

FIGS. 3a–3c shows sectional views, taken along line III—III in FIG. 2b, of the joint according to the invention in three different positions of cantilever arm AR. In FIG. 3a the cantilever arm is shown in the folded state corresponding to FIG. 1 and FIG. 2a, with the lateral edges of guide rails SL, SR resting on folded stops EL and ER. The space L3, namely the vertical distance (relative to satellite structure SAT) between a folded stop and the first movable turn of the coil spring F is dimensioned so that the spring is tensioned (not merely bent) in this folded position of the cantilever arm. As a result, cantilever arm AR is firmly locked to protect it against vibration.

In FIG. 3b, cantilever arm AR is shown unfolded. As already stated in the description of FIG. 2b, the arm is in a stable three-point position and rests on the three unfolded stops A1L, A1R, and A2.

FIG. 3c shows the joint during overswing beyond the equilibrium position. The guide element with adjusting screw S then abuts third unfolded stop A2 on a rib on the horizontal base plate of frame R.

In theory, springs F can be located in the middle between unfolded stops A1L and A1R on the one hand, and A2 on the other. However, in the embodiment shown in FIG. 3, springs F are offset to the left, toward the unfolded stops A1L and A1R, so that the distance L1, projected on the motion plane of the cantilever arm, between spring F and first and second unfolded stops A1L, A1R in this design is approximately 2.5 times smaller than distance L2, projected on the motion plane, between spring F and third unfolded stop A2. This asymmetry serves the following purpose: basically both swinging in and overswing should take place as gently as possible; in other words shock loads should be kept as small as possible. On the other hand, during overswing, deflection beyond the equilibrium position should not be too great, in order to avoid collisions with other instruments or objects on the satellite structure. During swinging in, the risk of collision is not involved since the entire area between the unfolded position of cantilever arm AR (FIG. 3b) and the position in the folded state (FIG. 1) must be kept clear. Because of the relatively short distance L1, cantilever arm AR will swing especially gently during swinging in, since springs F are primarily bent and not stretched, and for the same reason will undergo considerable deflection beyond the equilibrium position. During overswing on the other hand, because of the relatively large distance L2, the springs are stretched farther than during swinging in. The deflection of cantilever arm AR is thus less than during swinging in. As a result, the continued swinging movement beyond the equilibrium position (overswinging) is no longer as gentle but is still sufficient to avoid significant shock loading.

This possibility for making the swinging behavior different in the two deflection directions is an important advantage of the device described. The ratio L2:L1 can thus be set as desired depending on the specific requirements regarding shock loading and possible risk of collision.

A ratio L2:L1 in the range from 2 to 4 has proven especially advantageous in previous applications.

The guide element with guide rails SL, SR running parallel to the side walls of articulated frame R ensure movement of the cantilever arm within a plane.

The second spring used in the embodiment serves primarily for reasons of redundancy. The function of the joint according to the invention is not adversely affected by omitting one of the two springs. In particular, the movement of the cantilever arm is obtained even with only one functional spring in the established motion plane.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A joint for folding and unfolding a cantilever arm on a spacecraft, comprising:

a guide element which is rigidly attached to an end of the cantilever arm;

stop plates rigidly attached to the spacecraft;

at least one spring element which is connected with the cantilever arm and with the spacecraft and is pretensioned to hold said guide element in contact with said stop plates, said stop plates having first and second unfolded stops located symmetrically relative to a motion plane of the cantilever arm;

a third unfolded stop, whereby during unfolding of the cantilever arm, the guide element alternately contacts the first and second unfolded stops on the one hand and the third unfolded stop on the other, and in an unfolded state of said cantilever arm, the guide element abuts all three unfolded stops; and said stop plates also have first and second folded stops which abut said guide element when said cantilever arm is in a folded state.

2. A joint according to claim 1 wherein a distance of said at least one spring from the third unfolded stop is greater than a distance of said at least one spring from the first or second unfolded stops.

3. A joint according to claim 1 wherein in the folded state of cantilever arm, the tension spring is tensioned to lock the cantilever arm to protect against vibration.

4. A joint according to claim 1 wherein two coil springs are provided.

5. A joint for folding and unfolding a cantilever arm on a spacecraft, comprising:

a guide element rigidly attached to an end of the cantilever arm;

first and second stop plates rigidly coupled to the spacecraft, said stop plates being symmetrically situated on opposite sides of a motion plane of the cantilever arm, each said stop plate having a contacting surface comprising a folded stop portion for contacting said guide element in a folded state of said cantilever arm, and an unfolded stop portion for contacting said guide element in an unfolded state of said cantilever arm, said unfolded stop portion and said folded stop portion being connected by a curved portion of said contacting surface;

a third unfolded stop rigidly coupled to the spacecraft; and at least one spring element which is connected with the cantilever arm and with the spacecraft, and is pretensioned to hold said guide element in contact with said contact surface of said stop plates.

6. A joint according to claim 5 wherein said spring element holds said guide element in contact with said folded stops in said folded state of said cantilever arm, and holds said guide element in contact with said unfolded stop portions of said contact surfaces of said first and second stop plates, and with said third unfolded stop, in said unfolded state of said cantilever arm.

7. A joint according to claim 6 wherein said spring element holds said guide element in contact with said curved portion of said contacting surface during movement of said cantilever arm from said folded state to said unfolded state.

* * * * *